United States Patent [19]

Buck

[11] 4,447,693
[45] May 8, 1984

[54] POWER CONTROLLED MICROWAVE OVEN

[75] Inventor: Ronald G. Buck, Burnsville, Minn.

[73] Assignee: Litton Systems, Inc., Beverly Hills, Calif.

[21] Appl. No.: 313,904

[22] Filed: Oct. 22, 1981

Related U.S. Application Data

[62] Division of Ser. No. 73,077, Sep. 6, 1979.

[51] Int. Cl.³ .................................. H05B 9/06
[52] U.S. Cl. .................. 219/10.55 M; 219/10.55 B; 219/10.55 F; 426/243
[58] Field of Search ............. 219/10.55 M, 10.55 B, 219/10.55 R, 10.55 E; 426/234, 241, 243, 523; 99/325

[56] References Cited

U.S. PATENT DOCUMENTS

| | | | |
|---|---|---|---|
| 3,813,918 | 6/1974 | Moe | 73/15 B |
| 4,009,359 | 2/1977 | Tallmadge et al. | 219/10.55 B |
| 4,171,382 | 10/1979 | Buck | 426/243 |
| 4,196,332 | 4/1980 | Mackay et al. | 219/10.55 B |
| 4,210,795 | 7/1980 | Lentz | 219/10.55 B |
| 4,230,731 | 10/1980 | Tyler | 426/233 |

Primary Examiner—Roy N. Envall, Jr.
Assistant Examiner—M. M. Lateef
Attorney, Agent, or Firm—Robert E. Lowe; John M. Haurykiewicz

[57] ABSTRACT

Method and apparatus for controlling the food cooking time in a microprocessor controlled microwave oven in response to the remotely sensed condition of the food being heated. The average food temperature is constantly derived during cooking, utilizing user entered data on the food category, the food's initial mass, and the measured input power to the magnetron. The average current and average peak voltage input to the magnetron are sensed and the absorbed power in the food is derived using the magnetron efficiency. A self-calibrating analog to digital converter provides the magnetron input power in digital form for a microprocessor controller. In one embodiment the microprocessor sequentially derives the average food temperature as a function of cooking time using the entered food data, stored cooking coefficients previously determined by regression analysis, and the measured magnetron input power. In the preferred embodiment the microprocessor derives the cooking time as a function of the average food temperature using the entered food data, a stored constant previously determined by regression analysis, and the measured magnetron input power. In either embodiment means are provided so that the user may select the final food temperature within the range from "rare" to "well done" and cooking continues until the desired final temperature is reached.

7 Claims, 10 Drawing Figures

POWER CONTROLLED MICROWAVE OVEN

This application is a division of application Ser. No. 73,077, filed Sept. 6, 1979.

This invention relates to microwave ovens and more particularly to a method and apparatus for automatically controlling the food cooking time.

BACKGROUND OF THE INVENTION

The cooking time for food in a microwave oven presently is arrived at by various means. If large pieces of meat are being prepared, such as a roast, turkey, etc., one may insert a meat thermometer in the food item and continue cooking until the desired meat temperature is reached. The meat thermometer may be coupled to the microwave source through a microprocessor to deactivate the microwave source at the desired temperature. Alternatively, one may follow the oven manufacturer's recommendations relative to cooking time as a function of the type of food being cooked and the size of the item. In the case of vegetables, eggs, beverages, etc., thermometers or temperature probes are impractical, and thus the user must rely on the oven manufacturer's recommendation as to cooking time. However, the cooking time is a function of the power absorbed in the food, which typically can vary by plus or minus 270 watts due to variations in line voltage, oven production, etc. In a worst case situation the absorbed power can vary by plus or minus 360 watts.

Since the microwave oven is capable of cooking and heating a variety of food items, it is thus desirable to include means for automatically cooking or heating all food items until they have reached the desired final temperatures without the need for temperature probes. One such proposed automatic cooking system involves sensing the change in humidity in the microwave oven cavity as the food is being heated, determining when a humidity "trip point" is reached, and relating that factor to the total cooking time. The disadvantage of such a system is that it is strongly dependent upon the food's initial temperature and surface area, thus the system potentially can be only typically 20 to 35% accurate.

Another proposed system involves having the consumer enter information concerning the food mass and category into a microprocessor controlled microwave oven. The information is used to address a look-up table which contains the cooking intructions for that particular food. The look-up table is essentially a stored cookbook. One disadvantage of this system is that a meat temperature probe must be used with the look-up table, but the primary disadvantage is low resolution. That is, a finite amount of information can be stored in a look-up table in the microprocessor and in order to avoid excessive costs, some cooking situations must be left out. As an example, if a look-up table were designed to contain the information stored in a standard microwave cookbook, approximately 42,768 bytes of 8 byte microprocessor memory will be required. This amount of memory reduces the number of microprocessors that can be used for the oven controller, and the addition of more memory capacity could increase the cost of the controller excessively. Thus, the resolution of the look-up table would have to be reduced to a practical level, and as the resolution is decreased the system error is correspondingly increased, so that at a practical level the system error would be from 25 to 50%.

SUMMARY OF THE INVENTION

In accordance with the principles of the present invention, there is provided a method and apparatus for controlling the cooking time in a microwave oven in response to the remotely sensed condition of the food being heated. The absorbed power in the food being cooked is sensed remotely by sensing the input power to the microwave energy source to determine the absorbed power, and the cooking time is varied in response to the absorbed power.

In particular, in one embodiment a method and apparatus for controlling the cooking time for food is provided by sensing the input power to the microwave energy source, determining the absorbed power in the food using the sensed input power and the efficiency of the microwave energy source, determining the average temperature of the food using the absorbed power and several cooking parameters, including the food's initial temperature, specific heat, initial mass and the weight loss due to evaporated water during heating, and varying the food cooking time in response to the determined average food temperature. The average input power to the microwave energy source is sensed by means measuring the average magnetron current input and the average peak voltage input. The absorbed power is determined by a microprocessor-controller as a function of the magnetron's sensed input power and the magnetron's efficiency, where the magnetron efficiency is dependent on the food's mass and category. Using the absorbed power, food category and mass, and previously stored, appropriate cooking coefficients determined by regression analysis techniques, the microprocessor calculates the average food temperature and couples a corresponding output to the magnetron power input to accordingly vary the food cooking time. In another embodiment, and in many cases the preferred embodiment, the microprocessor calculates the food cooking time as a function of the food's mass and absorbed power in addition to a previously stored, appropriate constant determined by regression analysis. In either case, cooking continues until a desired final food temperature is reached.

A unique power sensing circuit is provided in which samples of magnetron input current and voltage are sequentially coupled to an analog to digital converter. The A-D converter converts the voltage level of a charging capacitor into a comparable time value so that the multiplication of the magnetron current and voltage values to obtain the magnetron input power is in the form of digital data which can be efficiently processed by the oven microprocessor. The A-D converter portion includes self-calibration means wherein the converter is calibrated immediately prior to converting the respective analog samples of magnetron current and voltage.

Means are also provided so that the user has a choice in the final food temperature in one embodiment, or the final cooking "time" in another embodiment, obtained in accordance with the cooking process. This variable enables the user to take into account and compensate for any variation in the magnetron or the oven cavity affecting the cooking parameters. Also the user would then have a means for adjusting the food cooking time and accordingly the food temperature to suit his own personal preference, that is, in a range from "rare" to "well done".

In operation, the user enters the food's mass and a code indicating the food's category. The oven microprocessor then repetitively utilizes this input data along with the derived absorbed power and the appropriate stored cooking coefficients in accordance with a controlled logic sequence, or algorithm to repetitively determine the average food temperature during cooking. The cooking time is varied and the magnetron power output is changed between a first 100% duty cycle and a second lower duty cycle. Cooking continues until the repetitively calculated food temperature reaches the desired final temperature.

In an alternative embodiment, the microprocessor operates in accordance with a different sequence. The user still enters into the microprocessor the food's mass and category code. Also, the remote power sensing method and apparatus to derive the absorbed power remains the same as in the first mentioned embodiment. The microprocessor repetitively uses the input data, the derived absorbed power, and the appropriate stored constant to repetitively determine the food cooking time. Cooking continues until the calculated food cooking time reaches the desired final cooking time.

A microwave oven using power sensing in accordance with the principles of the present invention offers significant advantages over existing and proposed automatic cooking systems in that many more food items can be automatically cooked, the temperature probe is eliminated, a humidity sensor is not required, a cover on the cooking vessel is not required, direct feedback of the magnetron power input is utilized, and a potential accuracy of 10% can be obtained. Typical accuracies may range between 10-13%, which is a significant increase in accuracy over any existing, automatic microwave cooking system. In addition, since the present invention senses the magnetron input power to derive the absorbed power, all of the previously described variations in absorbed power will be taken into account in arriving at the required cooking time.

DETAILED DESCRIPTION

Figure 1:
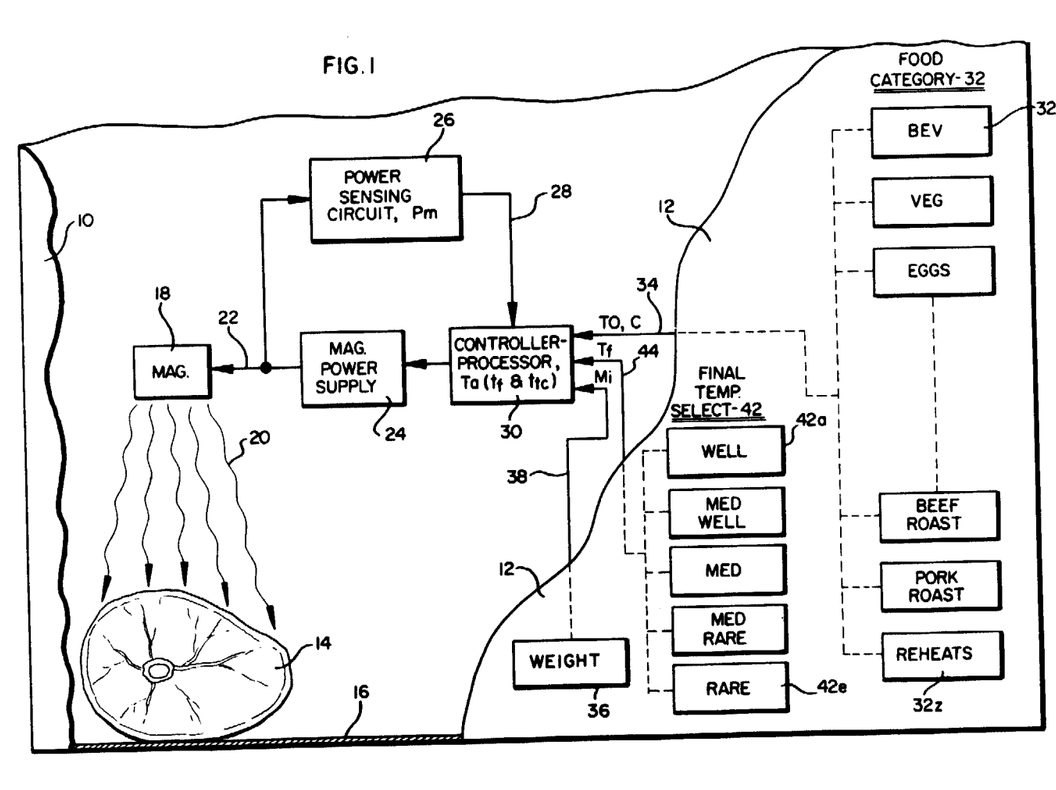
FIG. 1 is a block diagram illustrating a microwave oven for automatically cooking foods in response to the remotely sensed condition of the food being heated in accordance with the present invention.

Referring now to FIG. 1, there is illustrated in block diagram form the components of a microwave oven in accordance with the principles of the present invention. A microwave oven 10 is schematically fragmented and with front panel 12 cut away to illustrate a food item 14 mounted on a standard shelf 16 during a heating or cooking cycle. A magnetron 18 supplies a source of microwave energy 20 for heating and cooking food item 14 in a standard manner. The power into magnetron tube 18 is supplied on line 22 through a magnetron power supply 24. A power sensing circuit 26 senses the power input to the magnetron on line 22 and feeds the corresponding data on line 28 into an oven controller 30 which includes a microprocessor.

Panel 12 on microwave oven 10 contains a keyboard location 32 labeled "Food Category" in which are located respective data entry positions 32a through 32z each associated with a different food item. FIG. 1 illustrates only a representative sample of the various food categories, i.e., beverages, vegetables, eggs . . . beef roast, pork roast, etc. Each food category item 32 is associated with a respective temperature, $T_0$ and a specific heat value, C. Thus, actuation of a particular actuator at an associated data entry 32a through z addresses in memory, or in the microprocessor's read-only-memory a respective temperature, $T_0$ and specific heat, C, value in the microprocessor 30 through addressing line 34. Panel 12 also includes a keyboard data entry position 36 for the user to insert the initial mass of the food item into microprocessor 30 through input line 38. As will be described more particularly hereinafter, controller-processor 30 utilizes the sensed magnetron input power, the food category data and the initial mass data to calculate the food average temperature, $T_a$ during the cooking cycle. A corresponding signal is provided by the controller on output line 40 into the magnetron power supply 24 so as to control the power supplied to magnetron 18 and thereby vary the cooking time for the food item 14 until the final cooked temperature is reached.

Oven panel 12 also contains several keyboard locations indicated as Final Temperature Select 42 with several data entry positions 42a through 42e. Each of the keyboard data entry positions is coupled through line 44 to the controller 30. These positions enable the oven user to select either a more or less cooked food item in accordance with either his personal preference or as a means of compensating for system variations. It is to be understood the present invention may be practiced using only a pre-selected "medium" value for the final temperature, if desired.

AUTOMATIC MICROWAVE COOKING

As is illustrated in the general block diagram of FIG. 1, in accordance with the principles of the present invention, if the oven user enters the food mass and category and the magnetron power input is monitored, controller-processor 30 determines the average food temperature, $T_a$ (or alternatively the time to completion $t_{tc}$) to vary the cooking time until the desired final food temperature is reached. This result may be accomplished in view of the following.

Prior to the microwave cooking process, the consumer, in a practical sense, controls the initial state of the food to be cooked. During the process of microwave cooking various energy conversions occur that modify the combined physical and chemical state of the food. These state changes directly determine the "doneness", or accepted palatability. Subsequently, if the state variables can be isolated, electronically sensed and remotely monitored, and pragmatically correlated to the "doneness" of the food, this would eliminate the need for a temperature probe while improving the convenience of microwave cooking.

The primary state variables are:
1. The initial food mass.
2. The initial food temperature.
3. The specific heat of the food.
4. The surface area of the food.
5. The surface preparation of the food.
6. The initial food chemistry, i.e., fat, sugar, and water content.

Other, non-food related variables include the exact food location in the oven and the type of cooking vessel. As previously stated, during the microwave cooking process, various energy conversions occur that modify these initial state variables. Since the primary energy loss component is due to evaporation and since during the cooking process the evaporated weight loss is considerable, the standard energy equation, i.e., net energy equals energy in minus energy out, for the microwave cooking process can be equationally represented as:

$$C(M-W)(T_a-T_0) = 14.335\ (P_a)t - (639.55 - T_0)W_1$$

Where M is the initial food mass; $W_1$ is the weight loss as a function of time; C is the specific heat; $T_a$ is the true volumetric average food temperature; $T_0$ is the initial food temperature; $P_a$ is the absorbed power in the food item; t is cooking time; 14.335 is watts per calorie per minute; and $639.55 - T_o$ is the total energy lost due to evaporation per gram.

In order to determine the true average temperature of the food, the following cooking parameters must be known: initial temperature, specific heat, initial mass, absorbed power, and weight loss. Since the consumer can enter data corresponding to the food's initial mass and category, i.e., initial temperature and specific heat, means must be provided in the oven to determine the absorbed power and the subsequent vapor water loss. The absorbed power is a function of the food's dielectric properties, reflection coefficient and skin depth, which are all functions of the food chemistry and geometry. The food mass along with the basic microwave cavity design also impact the absorbed power. All of these parameters influence the magnetron's efficiency for a given food mass and food category.

The magnetron's efficiency is considered to be the ratio of microwave energy absorbed by the food to the total electrical input energy to the magnetron. That is, some of the microwave energy is absorbed by the waveguide and cavity walls, and some is reflected back to the magnetron. Thus, if the magnetron's input power, $P_m$, is monitored and the magnetron's efficiency, $E_m$, can be determined, and thus would be known, then the power absorbed by the food, $P_a$, can be calculated as the product of $E_m$ and $P_m$.

In experimental analysis of magnetron efficiency conducted by testing a large group of magnetron tubes, it has been established that the magnetron efficiency is independent of the anode temperature and stays constant until the end of the tube life. In addition, it has been found that for a given food mass and food category, the magnetron efficiency is the same for all magnetrons for the same model number. Stated conversely, it was found that there is a determinable magnetron efficiency for each food mass and food category. The composite results recited above are valid within an approximate two percent variation. Accordingly, if the consumer enters data corresponding to the food mass and category, the particular magnetron efficiency can be readily determined. Thus, the absorbed power can be calculated from the determined magnetron efficiency factor and by monitoring the magnetron input power as set forth in the relationship described previously.

The evaporated water loss factor is a function of the absorbed power, food mass, initial temperature, surface temperature, surface area and initial food chemistry. The mathematical relationship of the weight loss to these cooking parameters can be developed, and when substituted in the aforementioned energy equation, the following equation can be established:

$$T_a = T_0 + a_1[(P_a)t/M] + a_2[(P_a)t/M]^2 + a_3[(P_a)t/M]^3$$

Where $a_1$, $a_2$ and $a_3$ are coefficients determined experimentally for each of the food categories as represented in FIG. 1 by regression analysis. This equation may be further reduced to:

$$T_a = T_0 + \sum_{n=1}^{3} a_n[(P_a)t/M]^n$$

Therefore, as described in connection with the block diagram of FIG. 1, the consumer enters data relating to the initial food mass and category and controller-processor 30 receives this data along with data on line 28 representing the monitored or sensed input power to magnetron 18. From this data, the controller-processor 30 determines the absorbed power and derives the average food temperature, $T_a$, as a function of time, taking into account the weight loss factor through the coefficients, $a_n$. In another embodiment described hereinafter, the same data input will be used by controller-processor 30 to derive a value for the "time to completion" as a function of the average food temperature. In many cases, this last mentioned embodiment may actually be preferred by the consumer. Since the time to completion value can be displayed, this information in the form of a timer may be more meaningful to an oven user than the display of average food temperature versus time. In either event, the oven user must input the food category and mass, and means must be provided for sensing the power input to the magnetron so that a value of the absorbed power may be derived. The major difference between the two embodiments is the controlled logic sequence used by the processor 30. Accordingly, the following description of the power sensing means applies to either embodiment. The description of the power sensing means will then be followed by the respective logic sequences or algorithms relating to the first embodiment wherein the average food temperature is derived as a function of time and to the second embodiment wherein the time to completion is derived as a function of the average food temperature.

POWER SENSING

Figure 2A:
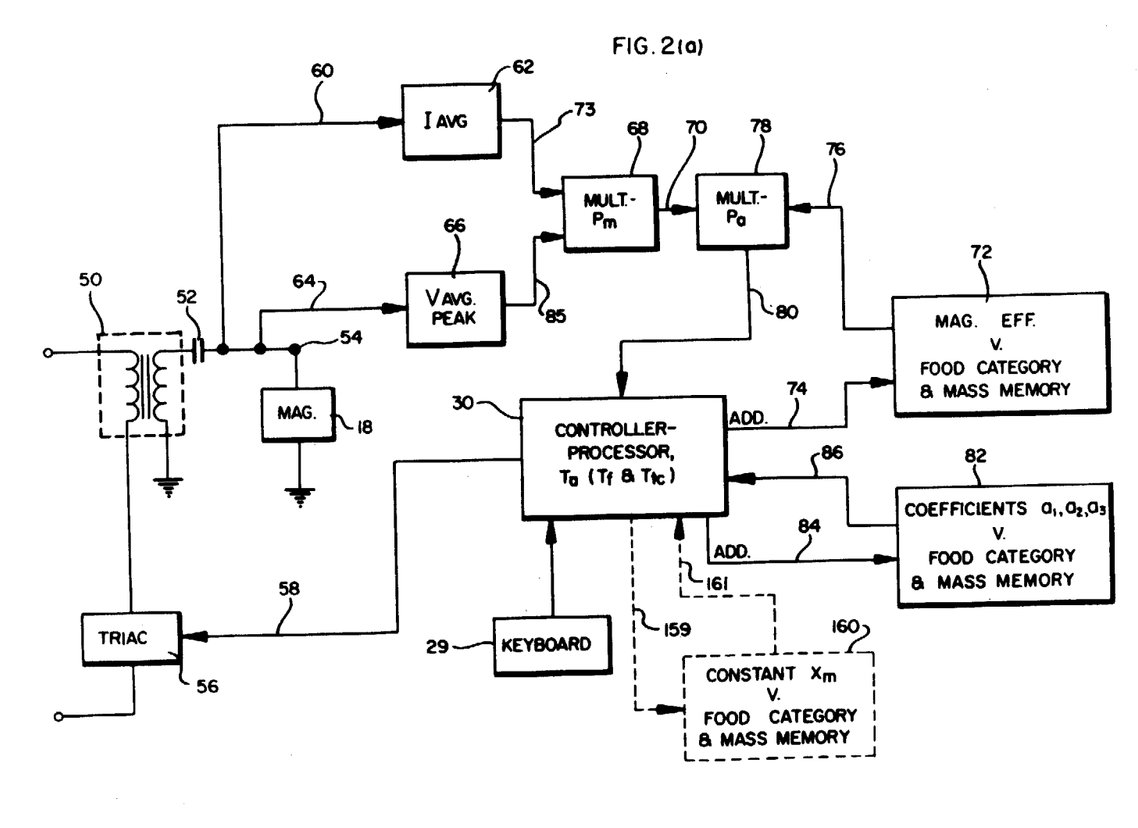
FIG. 2(a) is a block diagram illustrating one embodiment, including means for sensing the magnetron's power input, deriving the absorbed power in the food, and varying the cooking time in response to the absorbed power in the food.
Figure 2B:
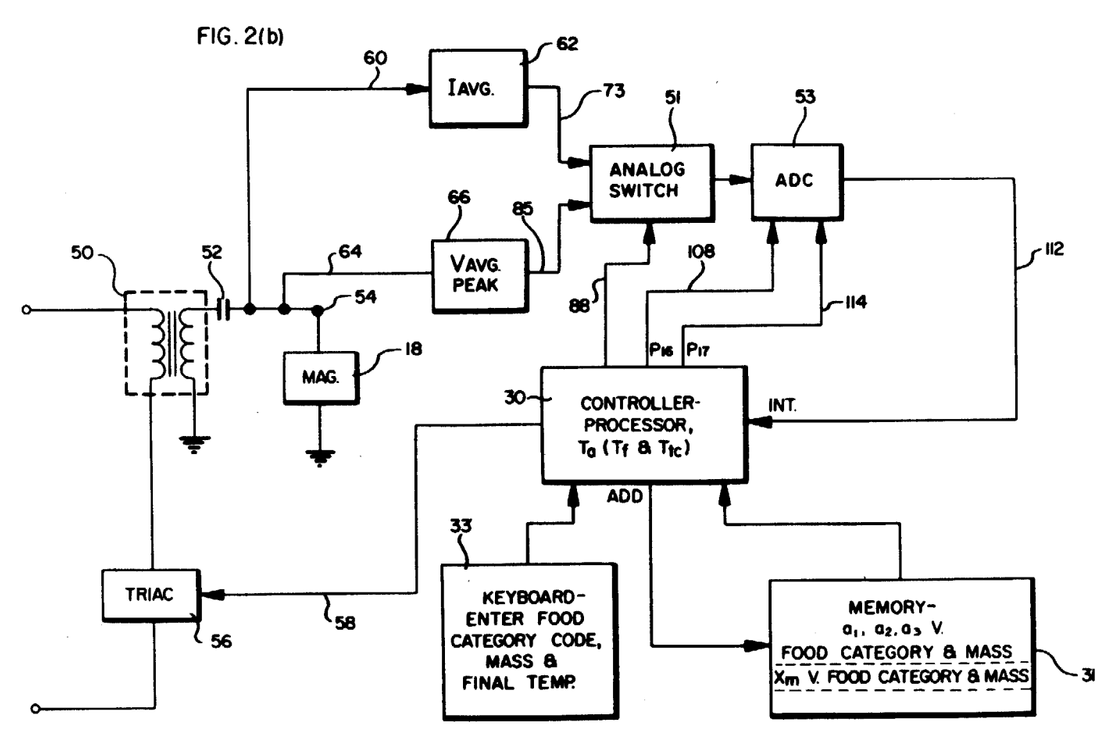
FIG. 2(b) is a block diagram illustrating the preferred embodiment wherein a microprocessor performs many of the functions illustrated in FIG. 2(a)
Figure 3:
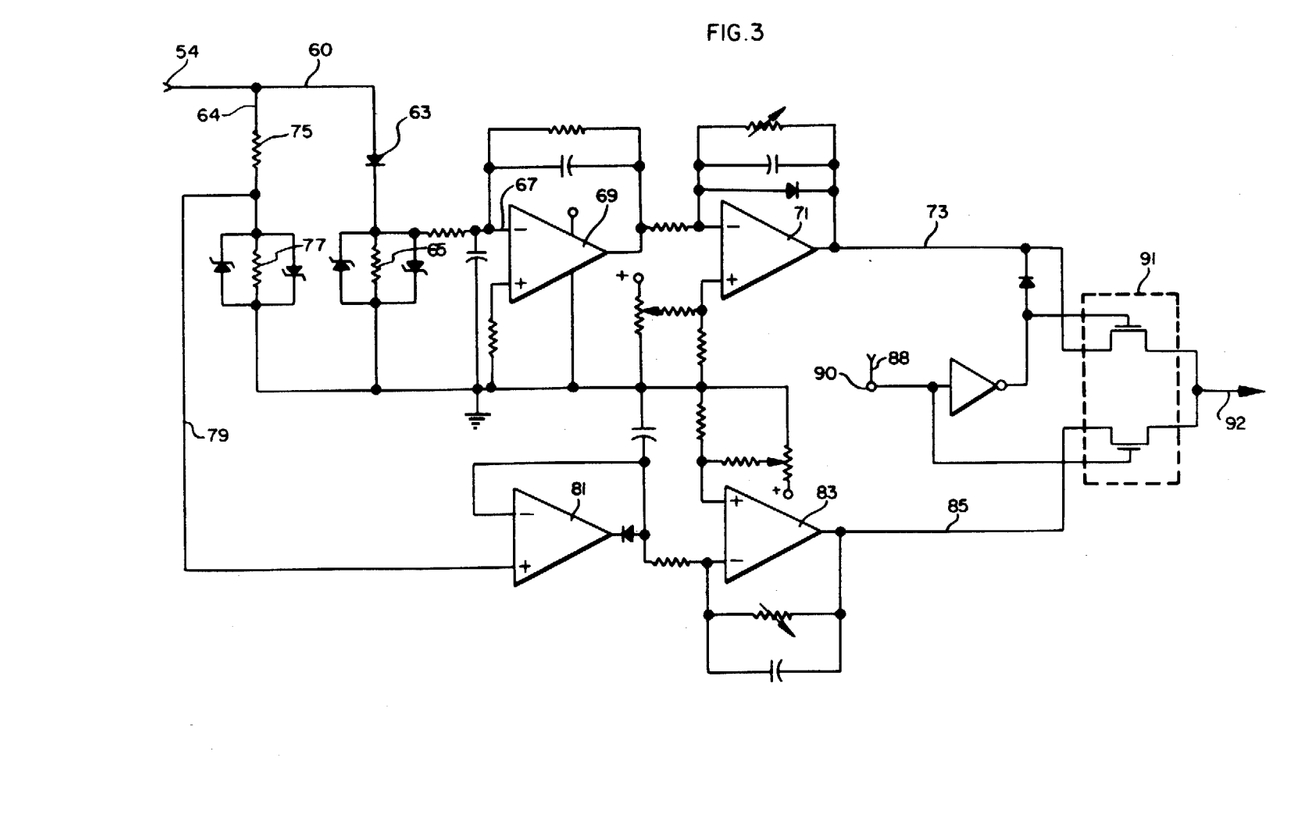
FIG. 3 is a schematic diagram illustrating a preferred embodiment of a power sensing circuit sampling the average magnetron current and the average peak magnetron voltage in accordance with one aspect of the invention.
Figure 4:
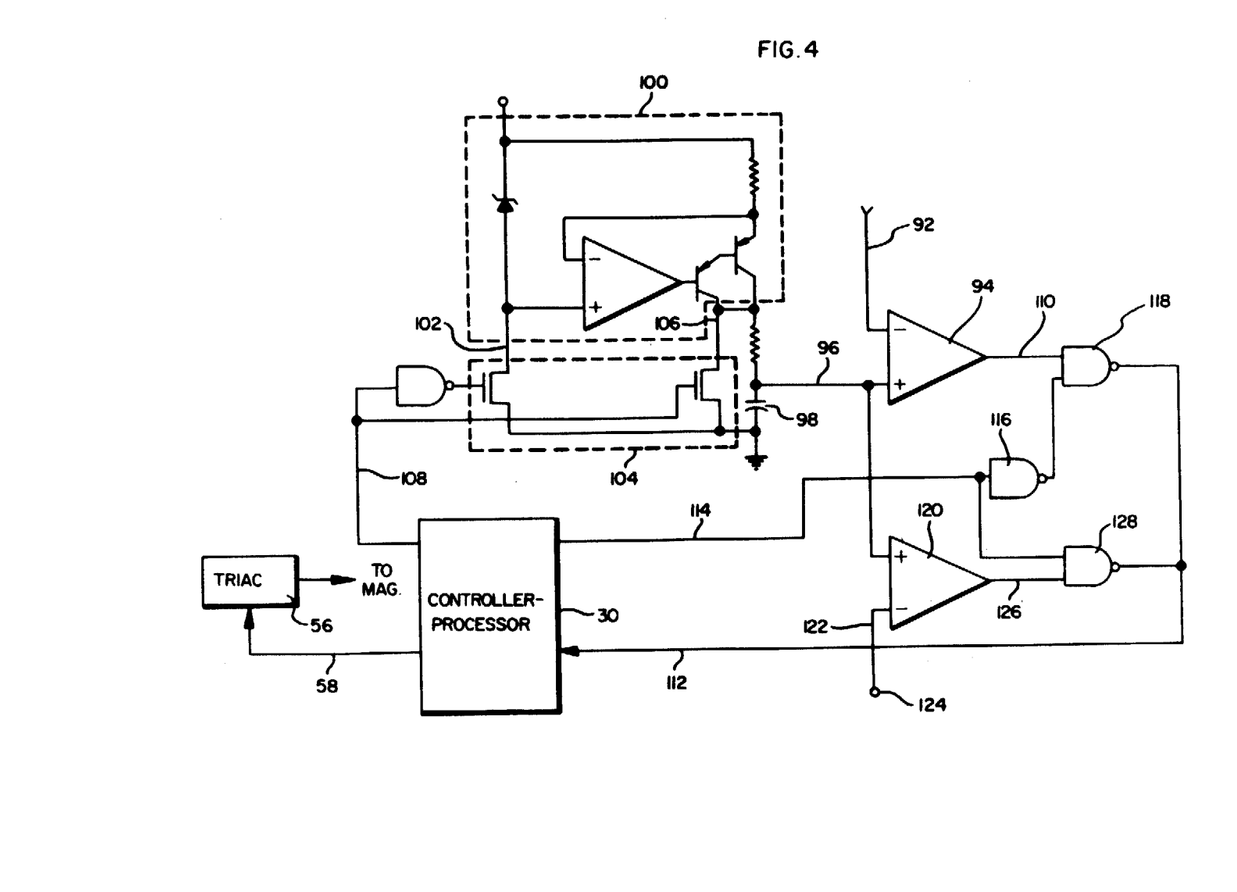
FIG. 4 is a schematic diagram illustrating an analog to digital (A-D) converter receiving the power sensing data and converting the data to digital form for processing, the A-D converter including self-calibration means.
Figures 5, 6, 8:
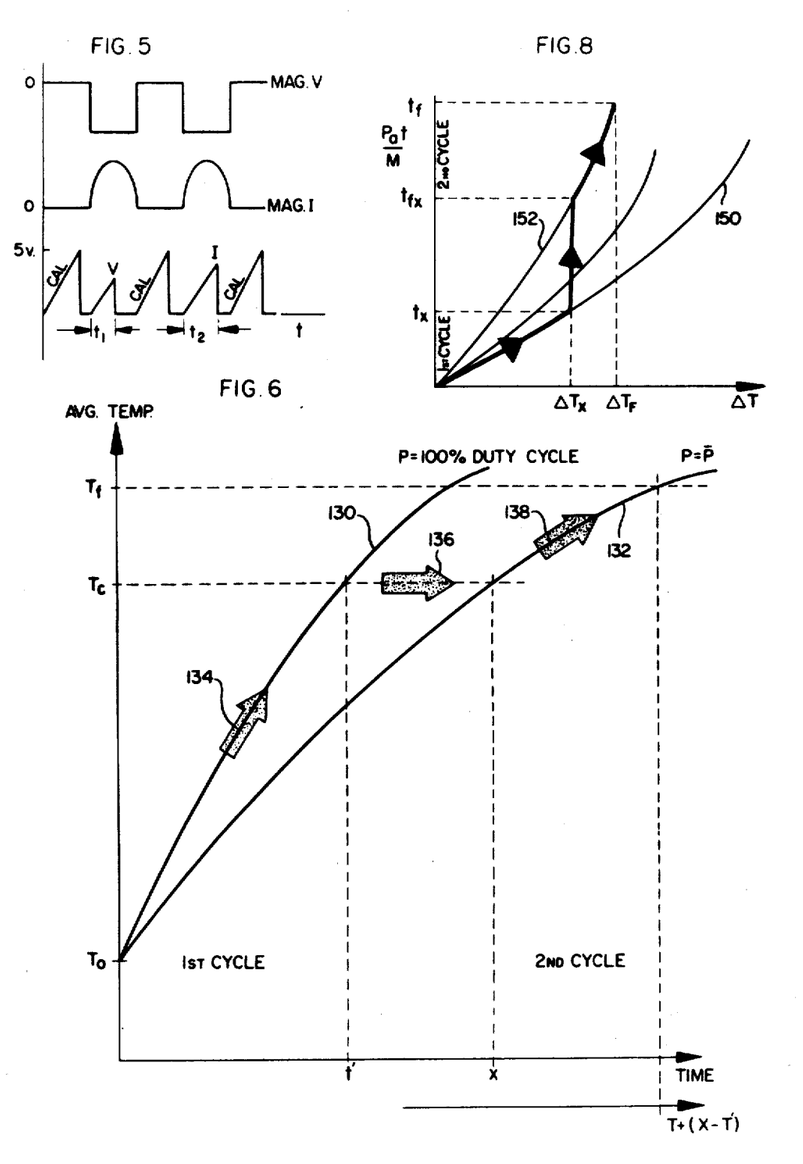
FIG. 5 is a waveform diagram illustrating self-calibration of the A-D converter immediately prior to measuring the sampled magnetron current and voltage.
FIG. 6 is a graph of a cooking cycle illustrating the average food temperature as a function of time for two respective magnetron power duty cycles for heating the food from an initial temperature, $T_0$ to a final temperature, $T_f$ in accordance with one embodiment of the invention.
FIG. 8 is a graph illustrating the change in average temperature, $\Delta T$ as a function of time for at least two different magnetron power duty cycles until the final food temperature is reached in accordance with another embodiment of the invention.

The overall block diagrams of FIGS. 2(a) and 2(b), the detailed power sensing circuit schematics of FIGS. 3 and 4, and the waveform diagram, FIG. 5, illustrate the means for sensing the power input to magnetron 18 and for determining the absorbed power in food item 14. The power input to magnetron 18 is supplied from a standard high voltage transformer 50 having a secondary winding coupled through capacitor 52 to the magnetron input at terminal 54. The transformer primary is coupled to a low voltage power supply (not shown) and is controlled by a triac 56 having a gate element for receiving controlling gating signals on line 58 from the controller 30. As is well-known in microprocessor controlled microwave ovens, controller 30 supplies trigger gating signals on line 58 to repetitively turn triac 56 on and off thereby switching the power to the primary transformer 50 on and off to conform to a desired power duty cycle for magnetron 18.

The power input to magnetron 18 at input terminal 54 is also coupled through line 60 to the input of an average current detector 62, with the same input being coupled on line 64 to the input of an average peak voltage detector 66. It can be shown that the average power input to magnetron 18 is equal to the magnetron anode average peak voltage multiplied by the magnetron average current. This operation is represented by multiplier 68 with the resultant value of the average magnetron power input being coupled on line 70 and utilized to derive the absorbed power. Memory 72 contains predetermined, respective values representing the efficiency of magnetron 18 as a function of various food categories and food masses. Memory 72 may, of course, be contained within microprocessor 30 or may be a separate memory unit. In any event, the user enters the food category "code", food mass, and temperature at keyboard entry positions 32, 36 and 42 (represented in FIG. 2(a) by the keyboard 29) into controller 30. Address line 74 from controller 30 addresses the memory 72 to present a corresponding value of magnetron efficiency on output line 76. Multiplier 78 represents means receiving the magnetron efficiency data on line 76 along with the average power input to the magnetron on line 70 to thereby derive the absorbed power which is in turn coupled on line 80 into the processor 30. Also, in FIG. 2(a), there is indicated a memory 82 containing predetermined, respective, stored data relating the coefficients $a_1$, $a_2$, $a_3$ as a function of the food category and mass. As in the case of memory 72, memory 82 may be a part of the processor 30 or a separate memory unit. The entered "code" for the particular food category and food mass enable the controller address line 84 to address memory 82 and subsequently fetch the cooking coefficients $a_1$, $a_2$, and $a_3$ on line 86 coupled to the processor 30. The elements indicated in the dashed lines of FIG. 2(a) relate to the alternative or preferred embodiment wherein the memory 82 is replaced by the factors stored in memory 160, and will be discussed hereinafter.

FIG. 2(b) illustrates a preferred embodiment in which there is no need to obtain the magnetron efficiency data in memory 72, and the operations of multipliers 68 and 78 are performed in the microprocessor 30. Initially, a variety of food categories and masses are cooked. During the respective cooking cycles the magnetron input power, $P_m$ is repetitively measured and related to the measured change in average food temperature. From this data the coefficients $a_1$, $a_2$, $a_3$ of the respective energy equations are obtained by standard regression analysis techniques. The respective coefficients are then stored in microprocessor memory 31. Thus, for a respective food category and mass, the changes in food temperature can be obtained by sensing the magnetron input power and using that value along with the coefficients $a_1$, $a_2$ and $a_3$ without the need to separately calculate the absorbed power value as in FIG. 2(a).

In sensing or monitoring the magnetron input power, the microprocessor 30 alternately actuates an analog switch 51 to alternately couple the magnetron average current and the average magnetron peak voltage to an analog to digital converter 53. Microprocessor 30 then derives the product of the magnetron current and voltage data to obtain a value for the magnetron input power.

The keyboard 33 is provided for entering the food category code, mass and final temperature as represented by the respective oven panel data entry positions 32, 36 and 42 in FIG. 1. Memory 31 contains the same stored information as in the FIG. 2(a) illustrated memories 82 or 160.

Referring now to FIGS. 3 and 4, there is illustrated a schematic diagram of a magnetron power input sensing circuit in accordance with one aspect of the present invention. In FIG. 3, terminal 54 and leads 60 and 64 correspond to the same elements as in FIGS. 2(a) and 2(b). The power input to the magnetron 18 at terminal 54 is thus sensed by lead 60 coupled through diode 63 and a five ohm resistor 65 to the inverting input 67 of an operational amplifier 69. The output of the second stage operational amplifier 71 at output line 73 represents the average magnetron current. Also, lead 64 is connected to a relatively large resistor 75 and a much smaller resistor 77 to reference ground. Resistor 75 is four megohms and resistor 77 is 2 kilohms. The voltage developed across resistor 77 is coupled on line 79 to operational amplifiers 81 and 83. The output 85 of operational amplifier 83 represents the average peak value of the magnetron anode voltage.

A multiplexer receives the sampled average magnetron current on line 73 and the sampled average peak magnetron voltage on line 85. A timed gating signal from line 88 of the controller-processor 30 is coupled to terminal 90 to sequentially activate the analog switch 91 to alternately couple the average current on line 73 and the average peak voltage on line 85 to the multiplexer output line 92. The microprocessor gating signal supplied to terminal 90 is synchronized with the magnetron pulsing signal supplied through line 58 to triac 56 as shown in FIGS. 2 and 5. Thus, during a power sensing sequence, every time the magnetron is pulsed, i.e., supplied power, the average magnetron current and the average peak magnetron voltage in analog form is alternately coupled to the multiplexer output 92 for coupling to an analog to digital converter shown in FIG. 4.

Multiplexer line 92 is connected to the inverting input of an operational amplifier 94 which operates as a comparator. The non-inverting input of comparator 94 is connected through lead 96 to capacitor 98. Capacitor 98 is alternately charged through a constant current source 100 through one lead 102 of bistable switch 104, and discharged through another bistable switch lead 106. Suitable outlet signals supplied from controller-processor 30 on line 108 switch line 102 during the charging of capacitor 98, and switch line 106 during the discharging of capacitor 98.

Capacitor 98 charges linearly in view of the constant current source 100. The comparator 94 on output line 110 goes high when the charging capacitor 98 exceeds the value of the sampled input voltage on line 92, with the corresponding time interval representing the value of the sampled input voltage. In one case this time interval will represent the average current, while in the next sensing cycle it will represent the average peak voltage. In both cases, the timed interval is coupled to controller-processor 30 on input line 112 by supplying a gating signal on line 114 to gates 116 and 118. Controller 30 processes the average current data followed by the average peak voltage data on line 112 to calculate the power input to magnetron 18—and eventually derives the absorbed power and average food temperature so as to supply a corresponding magnetron power control signal on line 58 to triac 56.

In accordance with another aspect of the present invention, the analog to digital converter as illustrated in FIG. 4 includes means for self-calibrating the power input measurements. This eliminates the normal need to use precision components or to precisely maintain the voltage levels constant. In particular, another comparator 120 has its non-inverting input coupled to the charging capacitor 98 and its inverting input coupled through lead 122 to a five-volt supply at terminal 124. The output line 126 of comparator 120 goes high when the charging capacitor equals five-volts. Since capacitor 98 charges linearly, the time for it to charge to a five-volt level is represented by the time it takes output line 126 to go high. The output of comparator 120 can be selectively coupled by a suitable controller-processor gating signal on line 114 through gate 128.

In operation, initially the output of comparator 120 is coupled to controller input line 112 and the time it takes capacitor 98 to charge from zero to the five-volt level is set into the controller to calibrate the measurement. Reference may be made to the graph of FIG. 5 illustrating the timing sequence wherein the sensing calibration takes place during the time period when magnetron 18 is off, i.e., not being pulsed. During the next period when the magnetron is being pulsed, controller 30 supplies a signal to terminal 90 to switch, for instance, the sampled average peak magnetron voltage on line 85 to multiplexer output line 92. In the meantime, after calibration, capacitor 98 has been discharged, so that during the sensing period it is now charging during the time, $t_1$ as shown in FIG. 5. The time interval, $t_1$ is being coupled from comparator line 110 to processor line 112 and thus represents the average peak voltage.

Controller 30 then supplies a suitable switching signal on output line 108 to discharge capacitor 98 immediately prior to the next calibration interval. During the next sensing calibration interval, a signal from controller 30 on line 114 connects the comparator output line 126 to processor input line 112, so that the time it takes capacitor 98 to linearly charge to the five-volt level is reset into the processor. Capacitor 98 is again discharged and when magnetron 18 is next pulsed on, charging capacitor 98 linearly charges until it reaches the average current value on input line 92. This is represented by the time interval, $t_2$ as shown in FIG. 5, and this time interval is entered into the processor through line 112. Controller 30 now has sufficient information to calculate the magnetron's input power and subsequently the absorbed power. Thus, in accordance with this aspect of the invention, the sensing measurements are calibrated immediately each time prior to the alternate sensing of sampled average peak magnetron voltage and average magnetron current.

MICROPROCESSOR COOKING CONTROLLER

As can be seen in FIG. 6, the average food temperature versus time is plotted for a first magnetron power input level, P, referenced to the 100 percent duty cycle curve labeled 130 and for another magnetron power input, $\bar{P}$ along the curve 132. The large reference arrows labeled 134, 136 and 138 illustrate that the average food temperature during cooking starts at the initial temperature, $T_0$, during a first cycle and follows along the 100 percent duty cycle curve 130. At the change temperature, $T_c$, the magnetron duty cycle is changed to obtain a magnetron power input of $\bar{P}$=duty cycle/100 (P) as indicated by the large reference arrow 136. During the second cooking cycle, the magnetron power input is maintained at $\bar{P}$ as indicated by the large reference arrow 138. This duty cycle is maintained until the pre-determined, average final temperature, $T_f$ is reached.

Figure 7:
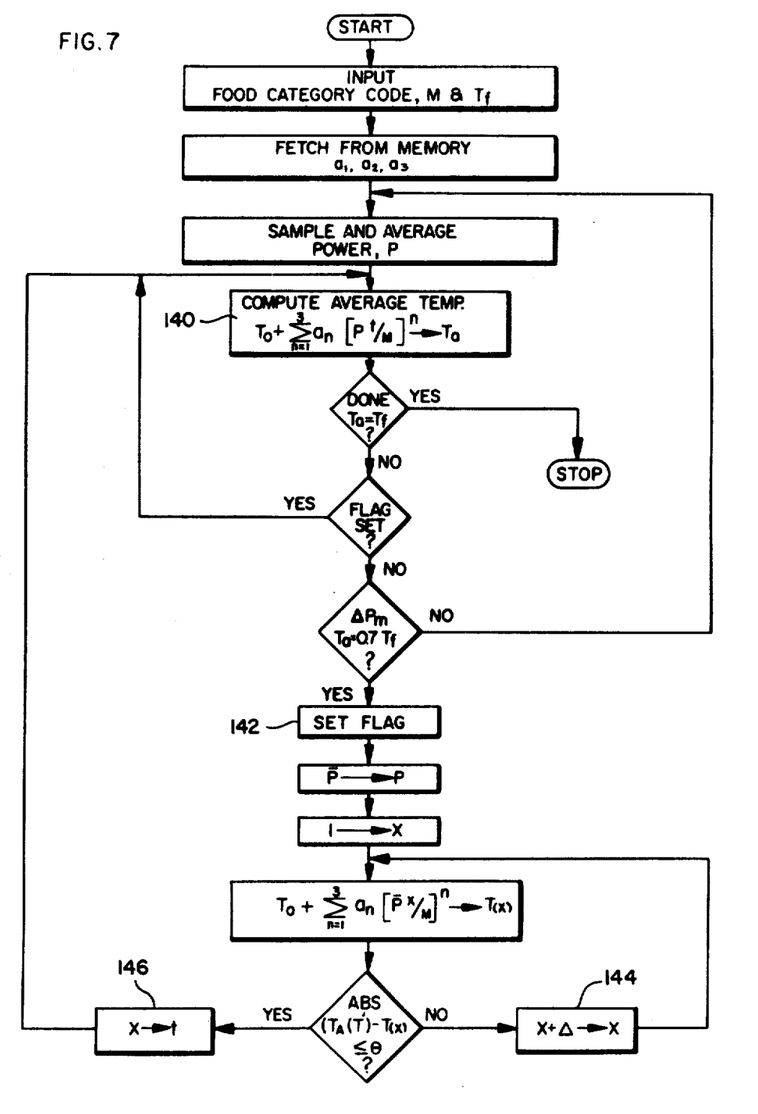
FIG. 7 is a flow chart illustrating the sequence of information flow as controlled by the microprocessor during the cooking cycle illustrated in FIG. 6.

FIG. 7 is a flow chart illustrating the sequencing of the information as controlled by the microprocessor during cooking. As can be seen from FIG. 7, the sequence is initiated by the oven user starting the oven in a normal manner. The user then enters the food category code by actuating one of the keyboard positions 32a through 32c; the initial food mass by actuating keyboard input 36; and selects one of the final temperatures by actuating a respective temperature selector 42a through 42e. The magnetron power input is sensed and the average absorbed power in the food is derived. The processor derives a running average of the absorbed power with respect to time. The microprocessor then obtains from memory 82 the respective cooking coefficients $a_1$, $a_2$, and $a_3$ relating to the entered food category code, mass, and final temperature selected. As represented in location 140, the average food temperature is then calculated using the coefficients $a_1$, $a_2$, $a_3$, the derived value of the absorbed power, and the entered food data.

Assuming that the average temperature, $T_a$ has not reached the final temperature, $T_f$, controller 30 continues to direct sensing of the magnetron input power, deriving the absorbed power, and repetitively calculating the average temperature, $T_a$. During this time, the magnetron is being pulsed at a 100 percent duty cycle so that triac 56 is continuously on and the average temperature is increasing as shown in FIG. 6 along curve 130 as represented by reference arrow 134.

As shown in location 142, when the average temperature reaches the change temperature, $T_c$, which is chosen to be 70 percent of the final desired temperature, the flag is set to prevent any further calculations of the average temperature using the previous values. New values of magnetron power input, $\bar{P}$ are continuously substituted for the original 100 percent duty cycle and the energy equation is solved iteratively backwards to determine the time shift due to the changing duty cycles. In this manner, increasing values of X, i.e., $X+\Delta$ are continuously substituted for each prior X value, as shown in location 144, until the curve 132 is reached where the calculated average food temperature matches the final desired temperature. The value of X is noted and substituted for t (location 146) and the average temperature is again calculated using the new X value in location 140. It is understood, of course, that the new magnetron duty cycle, $\overline{P}$ illustrated as curve 132 is set by the controller-processor 30 activating triac 56 in accordance with conventional practice.

The sensing operation continues and the controller-processor continues to compute average temperature in accordance with location 140, but with X substituted for t, until the "done" condition is reached, wherein the final temperature, $T_f$ has been obtained and cooking is stopped.

As can be seen from FIG. 6, initially magnetron 18 is operating at a 100% duty cycle, i.e., being pulsed on and off at a 60 Hz rate until the change temperature, $T_c$ is reached. Thereafter cooking proceeds at a lower $\overline{P}$ duty cycle until the final temperature is reached. This higher heating rate followed by a lower heating rate is preferred, although as noted in FIG. 6, the food may be cooked with the magnetron operating only in the lower power duty cycle so that cooking would continue along curve 132 from the initial temperature, $T_0$ to the final temperature, $T_f$. In that case, there would not be a change over in magnetron duty cycle and only the computations shown in location 140 in FIG. 7 would be required.

In the previous discussions, variations in the average temperature as a function of time have been the main concern. This relationship, however, may be reversed so that cooking time as a function of the changing average temperature can be determined. As indicated previously, in some cases this relationship may be preferred in that the processor could compute and display the time to completion to the oven user. Thus, this relationship may more nearly approach the conventional oven user practice in setting a timer for the desired cooking time and letting the timer count down to zero. The expression for time as a function of average temperature can be derived from the previous equation and expressed as:

$$t = M/P_a \sum_{n=1}^{3} b_n \Delta T^n; \text{ where } \Delta T = T_a - T_0.$$

This relationship is shown in FIG. 8, wherein $P_a t/M$ is the ordinate and $\Delta T$ is plotted as the abscissa, plotted for a first high magnetron duty cycle along curve 150 and a second lower magnetron duty cycle along curve 152. For a two cycle cooking operation similar to that shown in connection with the curves of FIG. 6 and the sequencing or algorithm of FIG. 7, then the equation can be rearranged as follows: $t_t = (M/P_a)X_m$; where $t_t$ = total cooking time = $t_f - t_{fx} + t_x$ and $X_m$ is a factor involving $\Delta t_f$ for each food category. Thus, the constant, $X_m$ and masses for measured values of magnetron input power related to $\Delta T_F$ can be obtained experimentally for various food categories by regression analysis and stored in memory 31 (or in memory 160 in the FIG. 2(a) embodiment). The total cooking time can then be determined using the stored value of $X_m$ for the particular food category, the initial mass, and sensing the magnetron input power as previously described.

The actual cooking operation would consist of a first cooking sequence in a high magnetron duty cycle along curve 150 until predetermined change time, $t_x$, which can be expressed as a predetermined percentage of the total cooking time, $t_f$. Thus, a controller for a microwave oven using cooking time versus average temperature relationship in a cooking sequence would require initially determining and storing in the controller memory a value of $X_m$ for each food category. In addition, an $X_m$ value would be obtained for each final temperature selection and stored in the memory. In addition, the change time $t_x$ would be stored (as well as values for the magnetron efficiency as a function of food category and mass in the FIG. 2(a) embodiment). In FIG. 2(a), memory 82 would be replaced by memory 160, whereas in the embodiment of FIG. 2(b), the stored constant $X_m$ in memory 31 would be used. Controller-processor 30, instead of calculating the average temperature would instead calculate the total cooking time, $t_f$ and the time to completion, $t_{tc}$.

Figure 9:
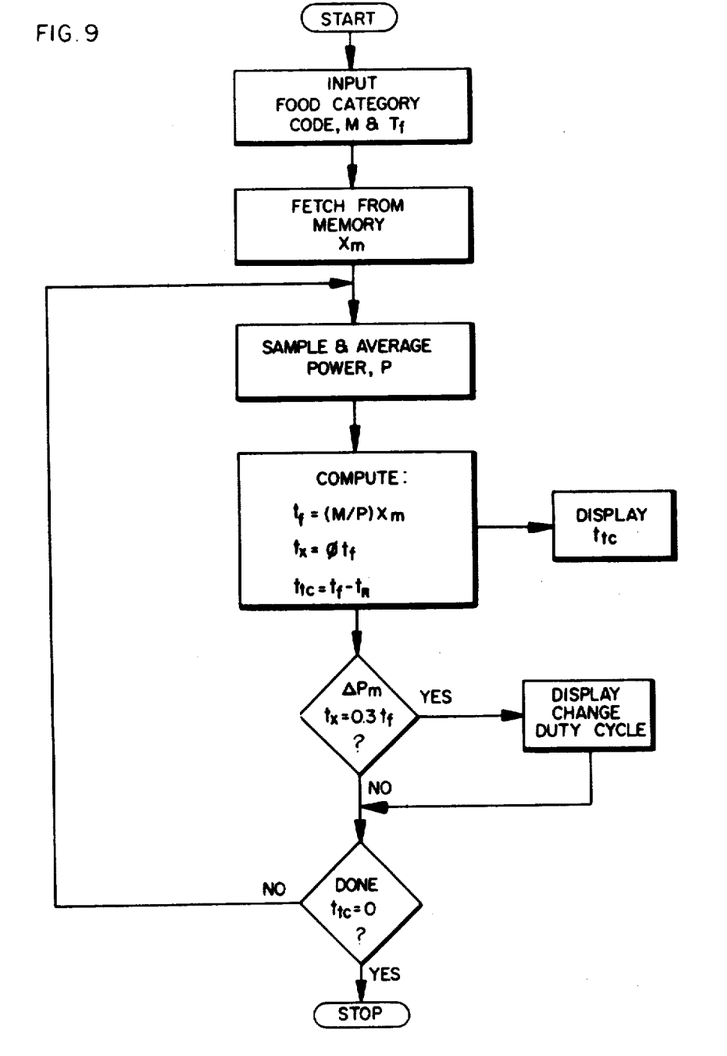
FIG. 9 is a flow chart illustrating the information flow as controlled by the microprocessor during the cooking cycle shown in FIG. 8.

Referring now to the flow chart sequences of FIG. 9, the oven user starts the system and then enters the food category code, initial mass and final temperature selection. A value of $X_m$ associated with the temperature selected is then obtained from the memory. Next, the magnetron input power is sensed and the average absolute power is derived taking into account the magnetron efficiency. As indicated in location 162, controller 30 takes the absorbed power value, the initial mass and the particular value of $X_m$ and computes the final temperature, $t_f$. The change over time, $t_x = \phi$ is also calculated wherein $\phi$ is a predetermined value such as 0.3, corresponding to the length of time it is desired to cook at the 100 percent magnetron duty cycle during the first cooking cycle compared to the total cooking time. In addition a calculation is made of the time to completion, $t_{tc} = t_f - t_r$, where $t_r$ is the real time since the oven was turned on. The time to completion may also be displayed so that the oven user has an indication of the remaining cooking time.

This power sensing and computing operation continues until the calculated value of change time equals 0.3 $t_f$, at which time the magnetron duty cycle is changed to the lower power level along curve 152. Note in this case that it is not necessary to solve the energy equation iteratively backwards as required in the sequence shown in FIG. 7. Instead, when the change time is reached at the end of the first cycle, the controller 30 activates triac 56 so that the magnetron duty cycle coincides with curve 152 as shown in FIG. 8 until the final time is reached. During the second cooking cycle with the magnetron duty cycle coinciding with curve 152, the magnetron power input is periodically sensed to derive the absorbed power and for recalculating the total cooking time and the time to completion. When the time to completion is zero, cooking is stopped.

While particular embodiments of the present invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

What is claimed is:

1. In a microwave oven including a microwave energy source for heating food, a method for controlling the cooking of said food comprising the steps of:

determining the absorbed power in said food during cooking;

determining the average temperature of said food being heated using the derived absorbed power and cooking parameters in the relationship:

$$T_a = T_o + a_1[(P_a)t/M] + a_2[(P_a)t/M]^2 + a_3[(P_a)t/M]^3$$

where, $T_o$ is the initial food temperature,
$P_a$ is the absorbed power in the food,
t is the food cooking time,
M is the initial food mass, and
$a_1, a_2, a_3$ are coefficients relating to food weight loss and are determined experimentally for various food categories and masses; and repetitively performing the above steps until the determined value of average food temperature, $T_a$, substantially equals the predetermined final value of average food temperature, $T_f$.

2. The method of claim 1, including the step of varying the power input to said microwave energy source during the cooking in response to the calculated average food temperature.

3. The method of claim 2, including the step of changing the power input to said microwave energy source when the calculated average food temperature equals at least 50% of the predetermined final value of the average food temperature.

4. The method of claim 2, including the step of lowering the power input to said microwave energy source during cooking.

5. The method of claim 4, including the step of lowering the power input to said microwave energy source from a 100% duty cycle when the calculated average food temperature is determined to be about 70% of the predetermined final value of the average food temperature.

6. The method of claim 1, including the step of selecting the predetermined final value of average food temperature.

7. In a microwave oven, including a microwave energy source for heating food, the improvement comprising:

sensing means for determining the absorbed power in said food during cooking;

means for determining the average temperature of said food being heated using the derived absorbed power and cooking parameters in the relationship:

$$T_a = T_o + a_1[(P_a)t/M] + a_2[(P_a)t/M]^2 + a_3[(P_a)t/M]^3$$

where, $T_o$ is the initial food temperature,
$P_a$ is the absorbed power in the food,
t is the food cooking time,
M is the initial food mass, and
$a_1, a_2, a_3$ are coefficients relating to food weight loss and are determined experimentally for various food categories and masses; and means for repetitively determining the average food temperature, $T_a$, until it substantially equals the predetermined final value of average food temperature, $T_f$.

* * * * *